United States Patent [19]
Spies et al.

[11] Patent Number: 5,501,075
[45] Date of Patent: Mar. 26, 1996

[54] ELASTIC MOUNTING APPARATUS FOR MOUNTING A TURBOCHARGER HOUSING ON AN INTERNAL COMBUSTION ENGINE

[75] Inventors: Karl-Heinz Spies, Birkenau; Willi Schweikert, Heidelberg; Armin Barth, Gorxheimertal; Hans-Gerhard Sander, Weinheim, all of Germany

[73] Assignee: Firma Carl Freudenberg, Germany

[21] Appl. No.: 405,127

[22] Filed: Mar. 16, 1995

[30] Foreign Application Priority Data

Apr. 18, 1994 [DE] Germany .................. 44 13 392.8

[51] Int. Cl.⁶ .................. F02B 37/00; F02M 35/10; F16L 17/073
[52] U.S. Cl. .................. 60/605.1; 123/184.71; 248/621; 248/635; 267/140.2; 267/141.1; 277/207 A
[58] Field of Search .................. 60/605.1; 123/184.21; 248/635, 638, 621; 267/161, 162, 293, 294, 152, 141, 140.2, 141.1; 277/27, 101, 206 A, 207 A, 211, 235 B

[56] References Cited

U.S. PATENT DOCUMENTS

| | | | |
|---|---|---|---|
| 2,305,295 | 12/1942 | Lang et al. ............... | 60/605.1 |
| 5,220,889 | 6/1993 | Ampferer et al. .......... | 123/184.21 |
| 5,231,957 | 8/1993 | Eckel et al. ............... | 123/184.21 |

FOREIGN PATENT DOCUMENTS

| | | | |
|---|---|---|---|
| 2744039 | 4/1979 | Germany ............... | 123/184.21 |
| 2824205 | 12/1979 | Germany ............... | 123/184.21 |
| 4125249 | 2/1993 | Germany . | |

*Primary Examiner*—Michael Koczo
*Attorney, Agent, or Firm*—Kenyon & Kenyon

[57] ABSTRACT

An elastic mounting apparatus for vibration-decoupled mounting of a housing on an internal combustion engine is disclosed. The mounting apparatus includes a clamping element with two spring elements arranged in a functionally serial relationship. The clamping element joins the housing and the internal combustion engine another so as to allow relative vibration. The first spring element includes an annular spring member made of an elastomeric material. A second spring element is formed by at least one disk spring, such that the clamping element is penetrated by a clamping screw, and such that the disk spring can be compressed by the clamping screw in such a way that its spring rate, after compression to the intended preload, is substantially zero. The housing is configured as a turbocharger housing with at least one intake pipe, such that the intake pipe has at one end, on the side facing the cylinder head of the internal combustion engine, an intake pipe flange that is braced in a sealing and vibration-decoupled manner against the cylinder head by an annular sealing element made of elastomeric material.

8 Claims, 2 Drawing Sheets

5,501,075

ELASTIC MOUNTING APPARATUS FOR MOUNTING A TURBOCHARGER HOUSING ON AN INTERNAL COMBUSTION ENGINE

BACKGROUND OF THE INVENTION

1. Field of the Invention

The present invention concerns an elastic mounting apparatus for vibration-decoupled mounting of a housing on an internal combustion engine. The apparatus includes a clamping element with two spring elements arranged in a functionally serial relationship, such that the clamping element joins the housing and the internal combustion engine so as to allow relative vibration. The first spring element includes an annular spring member made of an elastomeric material and the second spring element is formed by at least one disk spring. The clamping element is penetrated by a clamping screw, such that the disk spring can be compressed by the clamping screw such that its spring rate, after compression to the intended preload, is substantially zero.

2. Descriptionn of the Prior Art

A mounting apparatus is shown in German Publication 41 25 249 A1. This mounting apparatus is provided for joining an intake pipe to an internal combustion engine, and the annular spring member is made of an elastomeric material arranged in series with a disk spring made of metallic material. The disk spring is preloaded in such a way that its working point, on a spring force/spring travel diagram, lies on the horizontal portion of the substantially S-shaped spring characteristic curve. The working characteristics of the serially disposed spring elements are largely constant, irrespective of ambient temperature. The spring member made of flexible rubber material is provided for damping relatively low-frequency vibrations with large amplitudes, while the acoustically troublesome vibrations are isolated by the preloaded disk spring.

SUMMARY OF THE INVENTION

The underlying object of the invention is to develop a mounting apparatus that it is suitable for vibration-decoupled mounting of a turbocharger housing.

To achieve the object of the present invention, provision is made for the housing to be configured as a turbocharger housing with at least one intake pipe. The intake pipe has, at the end and on the side facing the cylinder head of the internal combustion engine, an intake pipe flange that is braced in a sealing and vibration-decoupled manner against the cylinder head by an annular sealing element made of an elastomeric material. The advantage of the present invention is that the entire turbocharger housing is braced in a completely vibration-decoupled manner against the internal combustion engine. Vibrations of the internal combustion engine are thereby reliably kept away from the turbocharger housing. The sealing element is arranged under elastic preload between the intake pipe flange and the cylinder head of the internal combustion engine, in such a way that boost pressures of up to 5 bar can be perfectly sealed.

According to an advantageous embodiment of the present invention, provision can be made for the sealing element to fit sealingly, under preload, around a radial projection of the intake pipe flange with a mounting projection extending in the axial direction. The sealing element preferably fits around the radial projection under radial and axial preload. In the interest of easy manufacturing, the sealing element and the radial projection are configured integrally and continuously with one another, from a uniform material.

The sealing element can be snapped in a loss-proof or preassembled manner onto the radial projection by means of the mounting projection. A configuration of this kind is of noteworthy advantage in terms of easy and uncomplicated assembly of the turbocharger housing equipped with the sealing element. The sealing element and the turbocharger housing thus form a unit that can be preassembled.

The sealing element can have at least two sealing lips that are associated adjacently and spaced from one another in the axial direction, such that one of the sealing lips sealingly contacts the intake pipe flange and the other sealing lip the cylinder head under elastic preload. The sealing element is configured so that boost pressures of up to 5 bar can be perfectly sealed. The fact that the sealing element rests against the parts being sealed with sealing lips results in a comparatively high specific surface pressure in these regions, and thus in outstanding sealing.

Additionally improved sealing of higher boost pressures can be effected by the fact that the sealing lips are spaced apart by a substantially V-shaped groove open in the direction of the flow-through cross section of the intake pipe. The result is an automatic and pressure-dependent preloading of the sealing lips against the intake pipe flange and the cylinder head of the internal combustion engine, as a function of the boost pressure in the intake pipe. For example, if only a comparatively low boost pressure is present in the intake pipe, the sealing lips are also pressed with only a comparatively low preload against the adjacent sealing surfaces. In this operating state, relaxation phenomena are reliably prevented by the comparatively low contact pressure. If, on the other hand, a comparatively higher boost pressure is present in the intake pipe, a comparatively higher contact pressure of the sealing lips against the adjacent sealing surfaces is produced. Because of the greater contact pressure of the sealing lips against the sealing surfaces, even very high boost pressures can be reliably sealed.

The sealing lip facing the cylinder head can be surrounded on its outer periphery by an auxiliary sealing lip. The auxiliary sealing lip handles the predominant portion of the bracing of the intake pipe against the cylinder head, while the two sealing lips are provided predominantly to seal the boost pressure.

The sealing lips and the auxiliary sealing lip can be surrounded radially and externally by an inflexible stiffening ring that is at least partly surrounded by the elastomeric material of the mounting projection. The advantage of this arrangement is that deformations of the sealing element in the radial direction, caused by positive pressure, are prevented by the stiffening ring. Another advantage is that the mounting projection does not detach from the radial projection of the intake pipe flange when the sealing element is acted upon by positive pressure. Installation of the sealing element inside the mounting apparatus is easy to perform.

BRIEF DESCRIPTION OF THE DRAWINGS

The mounting apparatus according to the present invention is explained in more detail below with reference to the attached drawings, in which.

DETAILED DESCRIPTION OF THE DRAWINGS

Figure 1:
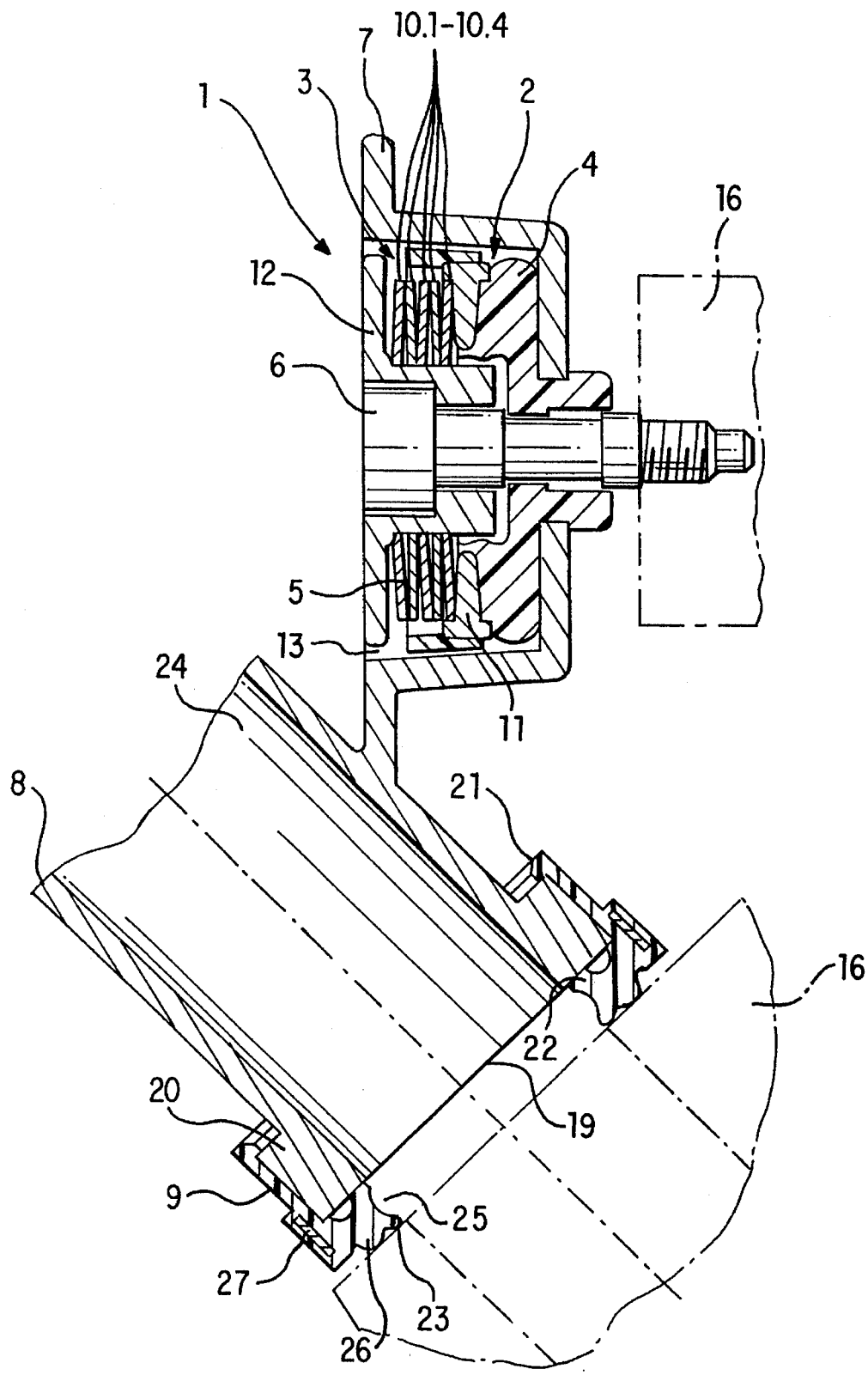
FIG. 1 shows a section of a turbocharger housing that is mounted by means of the mounting apparatus on an internal combustion engine.

FIG. 1 shows a section of a turbocharger housing 7 that can be mounted in a vibration-decoupled manner, by an elastic mounting apparatus, to an internal combustion engine 16. Turbocharger housing 7 is made of a polymeric material and is provided with a recess 13 in which clamping element 1 is arranged. Clamping element 1 has two spring elements 2, 3 arranged in series. First spring element 2 is an annular spring member 4 made of an elastomeric material. In this depiction, clamping element 1 is shown in the clamped state, when turbocharger housing 7 is installed on internal combustion engine 16. The second spring element 3 is a disk spring packet configured as a disk spring 5, the disk spring packet comprising four individual springs 10.1–10.4 oriented opposite to one another. In the uncompressed state, individual springs 10.1–10.4 each have a ratio of spring height h to material thickness s that in this case equals 2.5. Individual springs 10.1–10.4 are braced on the side facing spring member 4 against a disk-shaped buttress 11, and on the axially opposite side on a clamping disk 12. Clamping screw 6, which penetrates centrally through spring elements 2, 3, is threaded into a mounting eye of the crankcase of internal combustion engine 16 such that the working point of the spring characteristic curve of the disk spring packet lies on the horizontal portion of the S-shaped spring characteristic curve in a spring force/spring travel diagram. Because of the compression, spring member 4 is arranged inside clamping element 1 under elastic preload. Slight sagging phenomena during utilization of the mounting apparatus as intended are compensated for by the four individual springs 10.1–10.4 of disk spring 5. Intake pipe 8 is provided with a sealing element 9 made of an elastomeric material, and is applied sealingly to the cylinder head of the internal combustion engine under elastic preload. Sealing element 9 on intake pipe flange 19 is depicted enlarged in FIG. 2.

Figure 2:
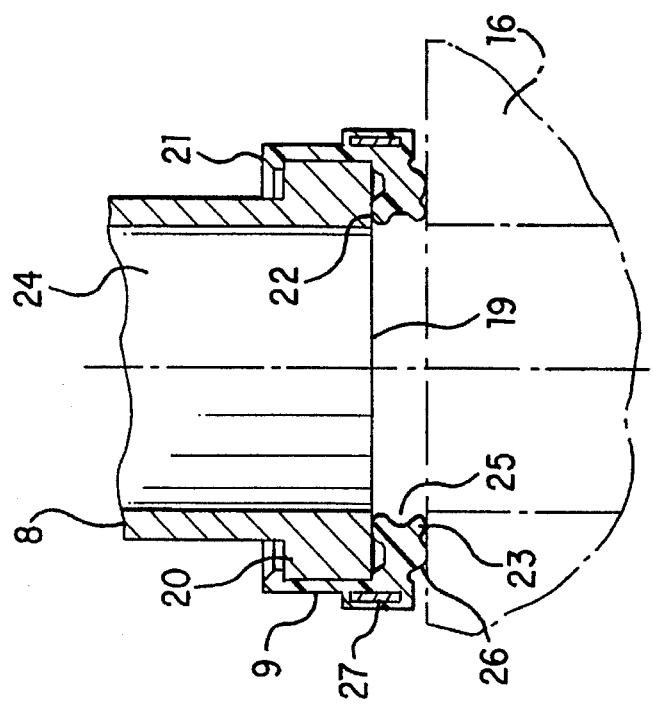
FIG. 2 shows a section of the intake pipe on which the sealing element is mounted.

FIG. 2 shows a portion of the intake pipe, such that sealing element 9 fits positively around intake pipe flange 19. Sealing element 9 is provided with a mounting projection 21 that extends substantially in the axial direction and has, on the side facing away from the cylinder head, a ridge-shaped enlargement projecting radially inward. Sealing element 9 is snapped, with its mounting projection 21, onto radial projection 20 of intake pipe flange 19, and held under elastic preload. Sealing element 9 is provided with mutually axially adjacent sealing lips 22, 23; sealing lip 22 sealingly contacts radial projection 20 of intake pipe flange 19 under elastic preload. The axially adjacent sealing lip 23 is also braced under elastic preload against the sealing surface of the cylinder head, which constitutes a component of internal combustion engine 16. Sealing lips 22, 23 delimit a substantially V-shaped groove, open in the direction of flow-through cross section 24, which produces a boost pressure-dependent sealing effect in the region of the sealing surface. If a comparatively low relative positive pressure is present inside intake pipe 8, for example in the region of 1.5 bar, the contact pressure of sealing lips 22, 23 against the respective adjacent sealing surfaces is comparatively low. On the other hand, if a high relative positive pressure, for example in the region of 3 bar, is present inside intake pipe 8, the result is a greater contact pressure of sealing lips 22, 23 against the adjacent flange surfaces of radial projection 20 and the flange surface of the cylinder head. Stiffening ring 27 prevents sealing element 9, when acted upon by high positive pressure, from expanding radially outward and thereby becoming overextended and possibly damaged. An additional or auxiliary sealing lip 26 may be provided adjacent sealing lip 23.

Figure 3:
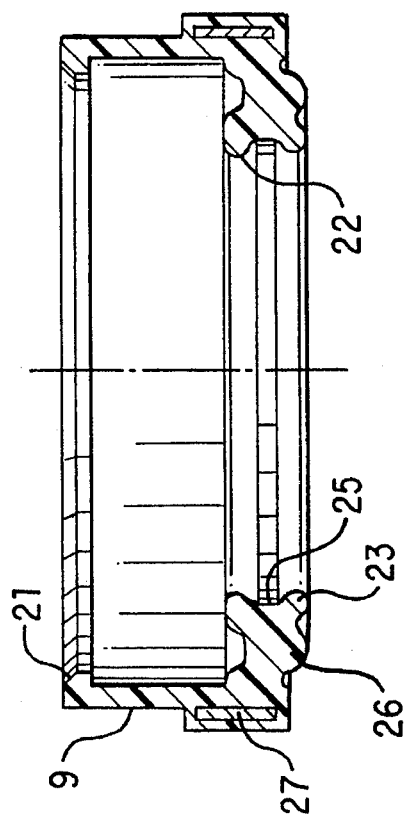
FIG. 3 shows the sealing element as an individual part, in an enlarged depiction.

FIG. 3 depicts sealing element of FIG. 2 enlarged, as an individual part.

Figure 4:
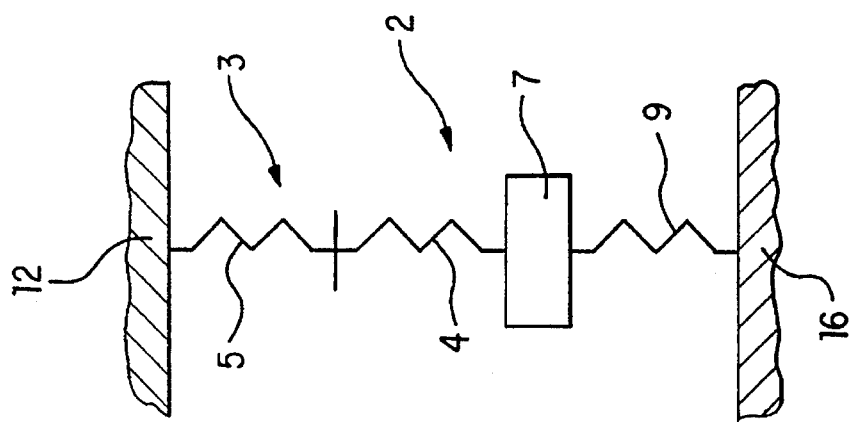
FIG. 4 shows an equivalent diagram of vibration-decoupled mounting of the turbocharger housing.

FIG. 4 shows an equivalent diagram of the mounting apparatus. It is evident that spring elements 2, 3 of clamping element 1 are arranged in a functionally serial relationship, such that freely vibrating turbocharger housing 7 constitutes the mass. Sealing element 9 is arranged between turbocharger housing 7 and the cylinder head of internal combustion engine 16. Because turbocharger housing 7 is suspended in a freely vibrating manner, solid-borne sound is not transmitted from the internal combustion engine to turbocharger housing 7. The entire mounting apparatus is also very easy to install.

We claim:

1. An apparatus for mounting a turbocharger housing including an intake pipe with an intake pipe flange on an internal combustion engine, comprising:

a clamping element comprising a first spring element and a second spring element, said spring elements being arranged in series, said clamping element joining said housing and said internal combustion engine so as to allow relative vibration between said housing and said internal combustion engine, said first spring element comprising an annular spring member made of an elastomeric material and said second spring element comprising at least one disk spring;

a clamping screw, said at least one disk spring being compressible by said clamping screw in such a way that its spring rate, after compression to an intended preload, is substantially zero; and an annular sealing element made of an elastomeric material sealing said intake pipe against a cylinder head of said internal combustion engine.

2. The mounting apparatus of claim 1, wherein:

said sealing element fits sealingly and under a preload around a radial projection on said intake pipe flange, said sealing element comprising a mounting projection extending in a radial direction.

3. The mounting apparatus of claim 2, wherein:

said sealing element is snapped onto said radial projection by said mounting projection.

4. An apparatus for mounting a turbocharger housing including an intake pipe with an intake pipe flange on an internal combustion engine, comprising:

a clamping element comprising a first spring element and a second spring element, said spring elements being arranged in series, said clamping element joining said housing and said internal combustion engine so as to allow relative vibration between said housing and said internal combustion engine, said first spring element comprising an annular spring member made of an elastomeric material and said second spring element comprising at least one disk spring;

a clamping screw, said at least one disk spring being compressible by said clamping screw in such a way that its spring rate, after compression to an intended preload, is substantially zero; and an annular sealing element made of an elastomeric material sealing said intake pipe against a cylinder head of said internal combustion engine, said sealing element comprising at least two sealing lips adjacent one another in an axial direction, one of said sealing lips sealingly contacting said intake pipe flange and another sealing lip sealingly contacting a cylinder head of said internal combustion engine under elastic preload.

5. The mounting apparatus of claim 4, wherein:

said sealing lips are spaced apart by a substantially V-shaped groove, and wherein said V-shaped groove is open in a direction of a flow-through passage of said intake pipe.

6. The mounting apparatus of claim 4, wherein:

said sealing lip contacting said cylinder head is surrounded on its axially outer periphery by an auxiliary sealing lip.

7. The mounting apparatus of claim 6, wherein:

said sealing lips and said auxiliary sealing lip are surrounded radially and by a stiffening ring that is at least partly surrounded by said elastomeric material of said annular sealing element.

8. An apparatus for mounting a turbocharger housing on an internal combustion engine, comprising:

an intake pipe comprising an intake pipe flange, said intake pipe being formed integrally with said housing;

a clamping element comprising a first spring element and a second spring element, said spring elements being arranged in series, said clamping element joining said housing and said internal combustion engine so as to allow relative vibration between said housing and said internal combustion engine, said first spring element comprising an annular spring member made of an elastomeric material and said second spring element comprising at least one disk spring;

a clamping screw, said at least one disk spring being compressible by said clamping screw in such a way that its spring rate, after compression to an intended preload, is substantially zero, said clamping screw clamping said springs against said housing.

* * * * *